July 3, 1962
A. BELTRAMI
3,042,747
ELECTRONIC TRANSMITTING SYSTEM
Filed Nov. 23, 1956
5 Sheets-Sheet 1
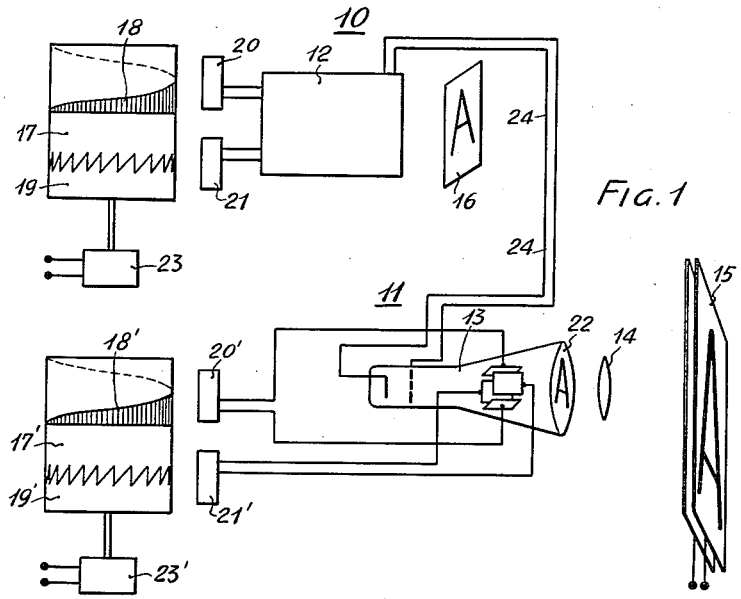
FIG. 1
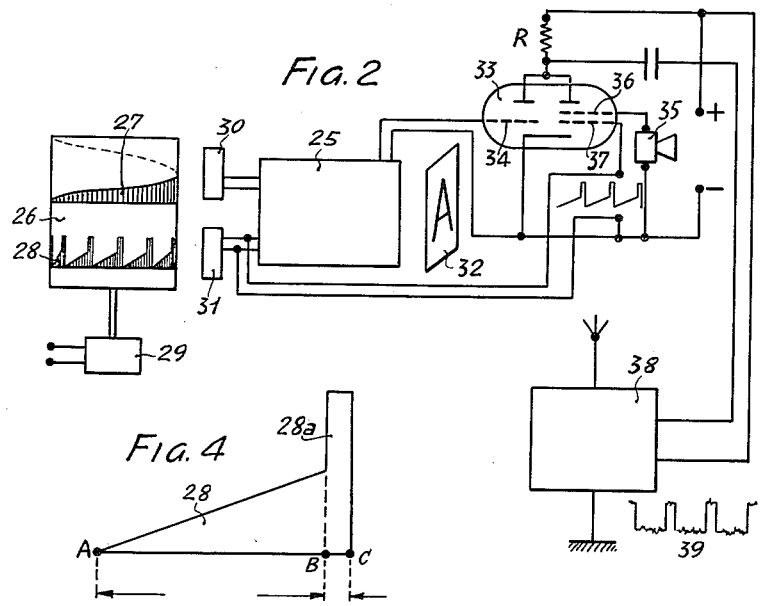
FIG. 2
FIG. 4
INVENTOR
AURELIO BELTRAMI
BY
ATTORNEYS July 3, 1962  A. BELTRAMI  3,042,747
ELECTRONIC TRANSMITTING SYSTEM
Filed Nov. 23, 1956  5 Sheets-Sheet 3

INVENTOR
AURELIO BELTRAMI

BY Ostrolenk, Faber,
Gerb & Soffen
ATTORNEYS

July 3, 1962 A. BELTRAMI 3,042,747
ELECTRONIC TRANSMITTING SYSTEM
Filed Nov. 23, 1956 5 Sheets-Sheet 4
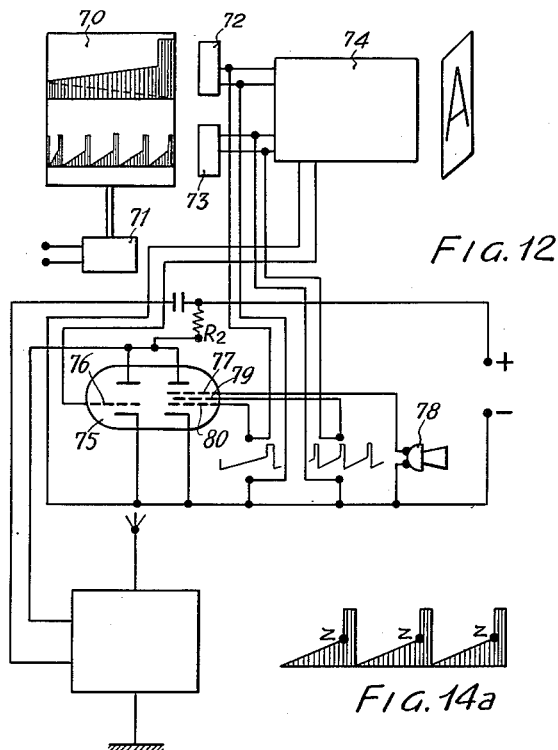
FIG. 12
FIG. 14a
FIG. 14b
FIG. 15
INVENTOR
AURELIO BELTRAMI
BY Ostrolenk, Faber, Gerb & Soffen
ATTORNEYS July 3, 1962

A. BELTRAMI 3,042,747

ELECTRONIC TRANSMITTING SYSTEM

Filed Nov. 23, 1956

INVENTOR
AURELIO BELTRAMI

BY Ostrolenk, Faber,
Gerb & Soffen
ATTORNEYS

United States Patent Office 3,042,747
Patented July 3, 1962

3,042,747
ELECTRONIC TRANSMITTING SYSTEM
Aurelio Beltrami, Via Circo 4, Milan, Italy
Filed Nov. 23, 1956, Ser. No. 624,119
9 Claims. (Cl. 178—5.6)

The present invention relates to a new system for the transmission of phonic, visual, or any electronic programs, which is particularly suitable to be applied to television sets, multiple telephony and telegraphy and to the simultaneous transmission of several electronic programs for automation i.e. for telecontrol of a robot or of a system of machines or devices performing automatically a given industrial process.

The system forming the object of the present invention is also advantageously applicable to the automatic electronic selection and to the transmission in the main languages of the phonic stage-directions of films and telenews transmitted by television.

The system forming the object of the present invention comprises a double transducer to generate reticles, at the transmitting station, and another double transductor at the receiving station and each one of them comprises a source of suitable radiations, two photoelectric (or other type) transductors suitable to transform said radiations in electric quantities of predetermined frequencies and shapes and a rotating body carrying two oscillograms in exact phase relation, one of which is at frame frequency while the other one a line frequency so as to modulate two beams of radiations generated by said source and directed on said two transductors, two small electric motors driving the two rotating bodies at the transmitting and receiving stations respectively, said motors being of the synchronous type and fed with currents of the same frequency and in exact phase relation, said units being combined with usual circuits and a common analysing camera tube at the transmitting station and reception elements at the receivers, and with devices for the signal radio transmission.

The reticles produced at the transmitting and receiving station may be of any kind, i.e., interlaced, or not, spiral, star-shaped or the like, and the utilized radiations may be luminous or invisible radiations or alternatively natural or artificial radioactive emanations and the oscillograms, will be preferably drawn on the surface of a rotating cylinder or disc so as to modulate by transparency or reflection said beams.

Said transductors, will be of photoelectric or radio-electric type, depending on whether luminous or invisible radiations, or particles of radioactive substances are used.

The absolute synchronism of the two reticles is due to the constant reciprocal position of the two oscillograms drawn on the same supporting element (paper, fabric, metal, plastic material of others) of both rotating bodies and to the fact that the micro-motors driving said rotating bodies are of the synchronous type and fed by electric currents in constant phase relation.

With regard to the application of the system according to the present invention, to the television, the system has the characteristic feature of consenting that the transmission of the phonic signal, obtained by means of amplitude, or other type modulation, takes place during the line return, of the beam, furthermore said system consents the use of very small kinescopes combined with light-amplifiers. These two characteristics provide considerable advantages as they cause a decrease in cost, weight and volume of the television sets.

With regard to the application of this system to the multiple telegraphy and telephony, the same televisive device as above is used with the addition of two compartment units, one at the transmitting station and the other at the receiving station, each consisting of as many compartments as the desired simultaneous communications, said compartments being situated at both stations in perfectly identical fashion. At the transmitting station, a luminescent lamp or any other equivalent means is placed in each one of said compartments in front of the television camera, the luminous intensity of said lamp being modulated by means of a microphone or any other similar type of modulating device so that all these variations in luminous intensity, which take place in every compartment, are transmitted as an ordinary scene of a televisive program and the compartment unit at the receiving station will be situated in front of the kinescope or the light amplifier and as said compartment unit is also provided with an identical number of compartments (as the one at the transmitting station) in each one of which will be placed a photoelectric unit as for instance a photoelectric cell, or a photomultiplier or a photo-transistor, it will be possible to feed the telephonic receivers through said elements and hence to obtain simultaneously all the desired telephonic transmissions.

To transmit multiple telegraphy, the microphones of the transmitting station are substituted by devices suitable for the point and line modulation of the light of the luminescent element placed in every compartment, while at the receiving station in the case of auricular reception the telephones may remain as they are or they may be replaced by the inputs of teletyping machines or the like.

For the transmission of programs or electronic controls for automation, the luminescent lamp or the equivalent element of every compartment will be modulated instead of by the microphone, by a photoelectric, or magnetic transductor or any other kind of suitable transductor, capable of transforming the electronic program conveniently impressed on paper or film into variable electric voltage while in every compartment of the receiving station there will be placed a suitable photoelectric transductor capable of transforming the variations in luminous intensity of the kinescope screen, into variations of electric quantities, said screen being fed by the televisive transmission of the compartment-unit placed at the transmitting station.

It is obvious that the number of frames necessary in this transmission system depends on the nature of the transmission to be made and on the degree of clearness of reproduction required by the transmission. Said number evidently increases changing from the telegraphy to the transmission of words and from the latter to the transmission of music; with regard to the transmission of program-fields for robots or for the control of industrial appliances, the required number of frames (fields) depends on the clearness with which it is desired to transmit the details of the electronic programs.

The number of the lines necessary in every frame (field), naturally increases proportionally to the number of the required simultaneous transmissions.

The accompanying drawings show in diagrammatic manner and by way of example some embodiments of the system according to the present invention, and namely:

FIG. 1 shows the diagram of an industrial wire-transmission television system without any phonic transmission.

FIGS. 2 and 3 show respectively the transmitter and the receiver of an industrial radio transmission television system comprising the phonic transmission and in which the small motors, which control the rotation of the bodies carrying the oscillograms, are fed by the same alternator.

FIG. 4 shows in detail the shape of the line-frequency oscillogram utilized in the television system illustrated in FIG. 2 and FIG. 3.

FIGS. 12 and 13 show the transmitter and the receiver of a circular television system.

FIGS. 14a and 14b show transductor oscillograms.

Figure 3:
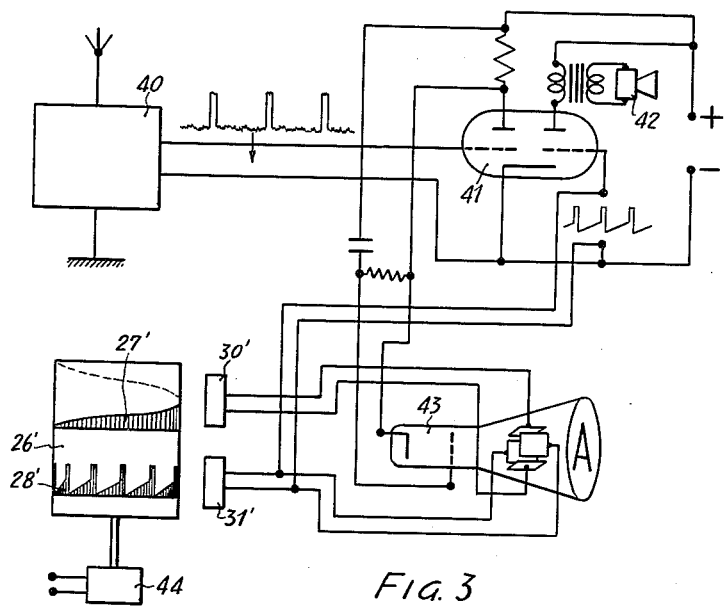

The industrial television system shown in FIG. 1 comprises the transmitter generally designated 10, and the receiver designated 11. The transmitter 10 comprises a televisive camera 12 for instance an oscillograph or a vidicon, while the receiver 11 comprises a receiving kinescope 13, which, in this case, is very small and is combined with an optic system 14 and a light amplifier 15, on which the image of the transmitted object is projected, said object being diagrammatically illustrated by 16 at the transmitter.

Devices to generate a reticle are provided at the transmitter as well as at the receiver and in this case a non-interlaced, 100 lines and 50 fields or frames reticle is assumed to be generated. Everyone of said devices, which for the sake of simplicity will be from now on generally called "photoelectric transductor," comprises a rotating cylinder or drum 17, on which two oscillograms or drawings 18 and 19 are drawn, one of which is at frame frequency while the other one is at line frequency. Said oscillograms, which modulate by reflection the rays of a luminous source (not shown), feed thereafter two photoelectric cells 20 and 21 respectively, which transform said radiations modulated by said oscillograms 18 and 19, into corresponding oscillating currents which feed the camera 12.

The transductor placed at the receiving station similarly comprises a rotating drum 17' carrying two oscillograms 18' and 19' which are the same as those drawn on the drum 17; said oscillograms modulate the luminous beams directed on the photoelectric cells 20' and 21' which feed the two respectively, frame and line frequency oscillating voltages, to the plates of the kinescope 13, said oscillating voltages being necessary to form a reticle on the luminescent screen 22 of the receiving kinescope. To each one of the two drums 17 and 17' is imparted a rotation by means of an electric synchronous, very low power motor. These are two-pole motors and are fed with a 50 cycle net-work voltage assuming that the net-work is fed by a single alternator with which the feeding voltages of the two motors 23 and 23' are in perfect phase relationship; therefore in this case no special device is necessary to assure the perfect synchronism.

As described, the two reticles are generated at both the transmitting and the receiving station while the video signal is transmitted by the camera 12 through the conductors 24 to the receiver, so as to modulate the electronic beam generated by the cathode of the kinescope 13.

When the transmitter 10 is operative, the image of the transmitted object 16 will appear on the screen 22 of the kinescope of the receiver 11, said image being conveniently enlarged and projected through the optic system 14 on the light-amplifier 15.

Naturally the same transmitter 10 may feed several receivers as the one designated 11 in the drawing, and the connections between transmitter and receiver will be of particularly simple nature just for the generation also at the receiving stations of the reticles, such a thing being made possible by this system of televisive transmission. It will also be possible to have a single transductor device generating reticles, and feeding several receiving kinescopes.

In FIGS. 2 and 3 of the accompanying drawings a transmitter and a receiver of a system of industrial radio-television provided with sound transmission and a feeding system with a net-work terminating at a single alternator are respectively illustrated in diagrammatic manner.

The transmitting station comprises in this case, as well as in the preceding one a televisive camera 25, combined with a photoelectric, reticle generating transductor, comprising as in the preceding case a rotating drum or cylinder 26 carrying two diagrams 27 and 28 at respectively, frame- and line-frequency, said cylinder being driven by a motor 29 as the one of the preceding case and a luminous source, not shown in the drawing, sends luminous radiations conveniently modulated by the two diagrams 27 and 28 on the two photo cells 30 and 31 respectively, which feed the televisive camera. Also in this case the object 32 to be transmitted is placed in front of said camera 25 and as in this case both the video and the phonic signal are to be transmitted by radio; the signal coming out of the camera is directed on the double tube 33, which contains two valves, one provided with a single grid 34, while the other is provided with two grids 37 and 36 respectively.

The video signal is sent on the grid 34 of one of the two valves while the phonic signal produced by the microphone 35 is sent on the grid 36 of the second valve and a signal corresponding to the line diagram 28 and taken at the output of the photocell 31 is also sent on the grid 37 of the same above mentioned second valve. This is done to greatly bias the grid 37 in order to cut-off the passage of a current during a part of the period of the line frequency oscillogram. A compound signal for the radio transmission of a video signal as well as of a sound signal is therefore obtained on the resistance R. The form of said compound video-phonic signal is diagrammatically illustrated in 39.

To avoid that the two video phonic signals interfere with each other at the receiving station, the oscillogram generating the line axis for the reticle at the transmitting as well as at the receiving station will not present the simple saw-tooth shape but the shape illustrated in detail in FIG. 4. Referring to said oscillogram 28, it may be seen how each of its waves presents an upwardly projecting extension of their final portion, that is, for a small amplitude corresponding for instance to one-tenth of its period, as it is clearly shown in 28a. This form of the oscillogram makes it possible that the exploring beam in the camera 25 at the end of each line, go beyond the photoelectric element of the camera and during this short interval the valve of the grids 36 and 37 becomes conducting and therefore consents the passage of the phonic signal deriving from the microphone 35. Said second valve remains in cut-off condition during the whole period of the video signal transmission and namely during the time interval A—B (FIG. 4) while for the interval B—C the second valve will become conducting causing so the transmission of the phonic signal.

The receiving apparatus of FIG. 3, comprises a demodulating amplifier 40, at the output of which a signal perfectly corresponding to the one designed 39 in FIG. 2 will be obtained and this signal is sent to a double valve 41 which will separate the two signals by sending the phonic signal to the loud speaker 42 and the video signal to modulate the electronic beam generated by the cathode of the kinescope 43. The reticle for said kinescope is generated, as in the case of FIG. 1, in the receiver itself and namely by means of a drum 26' carrying two oscillograms 27' and 28' perfectly corresponding to the ones of FIG. 2, said drum being combined with two photoelectric cells 30' and 31', whose outputs feed as in the preceding cases, the two pairs of deflecting plates of the kinescope 43. The image of the object 35 taken by the transmitter is so reproduced on the screen of the kinescope 43. The synchronous motors 29 and 44 are fed, as in the preceding case, by the same net work deriving from a single alternator, for which reason the rotation synchronism of the two motors and hence of the two drums 26 and 26' is assured.

Also of the receiving station the two phono and video signals, cannot interfere with each other as during the interval A—B of the oscillogram 28' there is no sonic signal combined with the video signal, since the corresponding valve is in cut-off condition, while during the interval B—C the sound signal does not disturb the vision as the electronic beam of the kinescope 43 goes out of the screen during that fraction of the period and therefore does not affect the luminous part of the screen itself; just in this interval the phonic transmission takes place.

Figure 5:
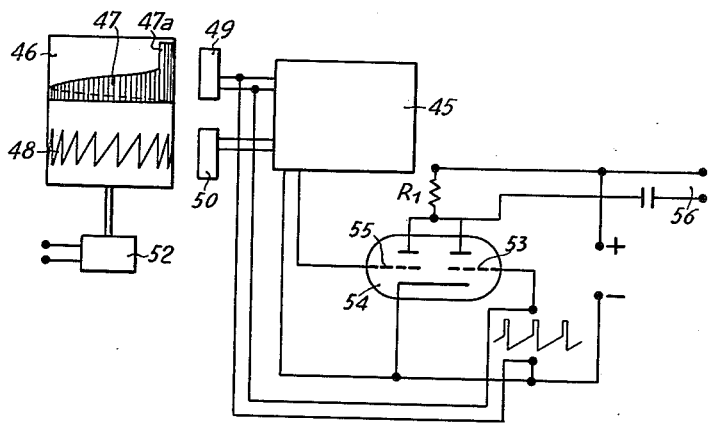
FIGS. 5 and 6 show respectively the diagrams of a transmitter and a receiver suitable for an industrial wire-television system without phonic transmission in which both, the transmitter as well as the receiver are fed by different sources.
Figure 6:
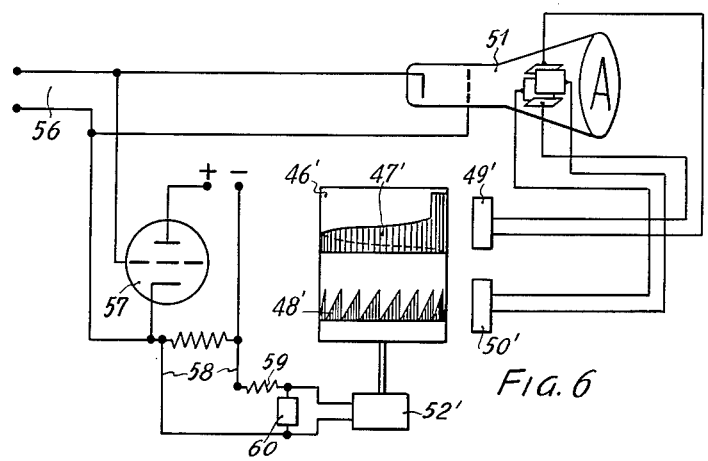

By way of example, an industrial wire television system without phonic transmission, as in the case of FIG. 1, but in which the motors of the transmitter and the receiver are fed by different sources, is shown in FIGS. 5 and 6.

In this case it is assumed, that the reticles to be generated at both, the transmitter and the receiver, are of the non-interlaced type with 200 lines and 25 frames.

The transmitter comprises as in the preceding cases, a televisive camera 45 combined with a photo electric transductor comprising a rotating drum 46 carrying the two diagrams or oscillograms 47 and 48 to generate the reticle, said modulating oscillograms being combined with two photoelectric cells 49 and 50 which feed the deflecting plates of an iconoscope.

Similarly the receiver comprises a kinescope 51, on which screen the reticle is generated by the transductor comprising a drum 46' equal to the one designated 46 of the transmitter, and carrying on its surface two oscillograms 47' and 48' respectively, combined with the two photoelectric cells 49' and 50'. The motors 52 and 52' controlling the rotation of the two drums 46 and 46' respectively are synchronous, four-poles 25 r.p.s. motors, which are fed by 50 cycle current. Whenever it is impossible to feed these two motors with electric alternating perfectly synchronised current, it is necessary to provide the perfect desired synchronism by some different means. To this purpose a feeding signal of the motor is sent together with the video signal from the transmitter to the receiver, said feeding signal being separated from the video signal at the receiving station and hence sent to the input of the motor 52'. The frame frequency oscillogram 47 of the transmitter presents every period an extension 47a suitable for the desired purpose. Due to the luminous beam, conveniently modulated by the diagram 47—47a the electric quantity supplied by the photo electric cell 49 is sent beyond the televisive camera 45 to form the reticle, at the grid 53 of a tube provided with a double valve 54 situated at the transmitting station, while a video signal is sent by the camera 45 on the grid 55 of the other valve contained in the same tube 54. A compound signal comprising the above mentioned feeding impulses and the video signal is obtained on the resistance R1 and said compound signal is transmitted to the receiver through all the conductors 56. At the receiver said signal will again be separated into its two components while the video signal is sent to the kinescope 51 to be modulated, and the feeding signal is sent to feed a motor 52' through a valve 57 and a suitable circuit 58, causing so the perfect, synchronized rotation of said motor with the motor 52'.

It could happen, however, that even if the two motors 52 and 52' rotate perfectly synchronous, the two frames at the camera 45 and on the kinescope be not in perfect phase relation. The above mentioned circuit 58 shown in FIG. 6, consents an automatic phase setting of the two frames, what presents another considerable advantage of the system according to the present invention. Said circuit comprises a resistance in series 59 and a photoelectric resistance 60 shunted on the terminals of the motor 52'. Said resistance is situated in front of the luminescent screen of the kinescope 51 just a little below the luminous frame for the purpose which will be described hereinafter.

Figure 7:
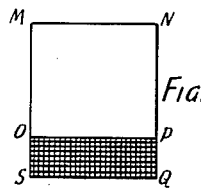
FIGS. 7, 8 and 9 show in a diagrammatical way one position in phase and two positions out of phase respectively, of the kinescopic field at the receiving station.
Figure 8:
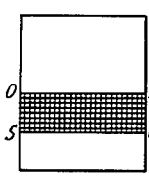
Figure 9:
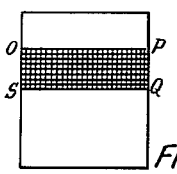

The luminescent frame appearing on the screen of the kinescope 51 when the televisive system is operative, is diagrammatically illustrated in FIG. 7. A luminous frame M, N, P, O (FIG. 7) and below said frame a dark rectangle O, P, Q, S, will appear on said screen and said dark rectangle does not disturb the normal operation as it does not interfere with the luminous frame. However if the frame at the receiving station should be out of phase with respect to the one at the transmitting station, the dark rectangle O, P, Q, S, would be in an intermediate position of the luminescent frame on the screen (see FIGS. 8 and 9) making the vision of the image practically impossible. It is therefore necessary to reset the frame in the right phase relation. To this purpose it is provided a photoelectric resistance 60 which, as mentioned before, is placed adjacent to the screen of the kinescope 51 in a region corresponding to the dark rectangle O, P, Q, S, so that, when the frame is in phase, said resistance presents a practically infinite value and therefore does not detract any current from the motor 52'. But, when said rectangle O, P, Q, S, is placed on the screen for instance at the position of FIG. 9 the region of the screen of the kinescope 51, which is in front of the photoelectric resistance 60, will be luminous and hence this light will influence said resistance decreasing its value and consenting the current to pass through it. It follows that the voltage at the terminals of the motor 52' decreases causing a slowing down of the motor itself and consequently a displacement of the luminous frame on the screen. This will bring about that the dark rectangle O, P, Q, S, be first displaced in a lower position than the one of FIG. 9 (FIG. 8) and then in the exact position as illustrated in FIG. 7. Hence the light, that was first hitting the resistance 60 is first reduced and then annulled so that the motor 52' will be fed with normal voltage and thus start rotating with its characteristic velocity, which will maintain the luminous frame M, N, P, O, and the dark rectangle O, P, Q, S, on the screen of the kinescope 51, in exactly the same position as the one illustrated in FIG. 7. This operation is automatically and quickly repeated, every time that the frame should go out of phase.

Another embodiment of the present invention may be a circular radio television system provided with phonic transmission and feeding of the transmitter and receiver by different power sources. In this case the same system as illustrated in FIGS. 5 and 6 may be used by using the prescribed televisive standard and transmitting the phonic signal separately from the video signal by the method used up to now in the televisive practice.

It is also possible to utilize the device illustrated in the FIGS. 2 and 3 of the accompanying drawings by making use of the prescribed televisive standard and separately transmitting the feeding impulse, which will feed the motor of the transductor comprised in the receiver.

Finally, it is also possible to transmit a single signal comprising the video, the phonic signal and the feeding impulse for the motor of the receiver and in this case the embodiment will consist in the combination of the devices provided in the industrial systems shown in FIGS. 2 and 3 and FIGS. 5 and 6 of the accompanying drawings. In said case the oscillograms of both the transductors, at frame frequency will present an extension at the end of each period, said extension corresponding to the feeding impulses of the receiver's motor, while the line frequency oscillograms will present a similar form to the one illustrated in FIG. 4 so as to consent the separation of the receiving periods of the video signal from the ones of the phonic signal.

Figure 13:
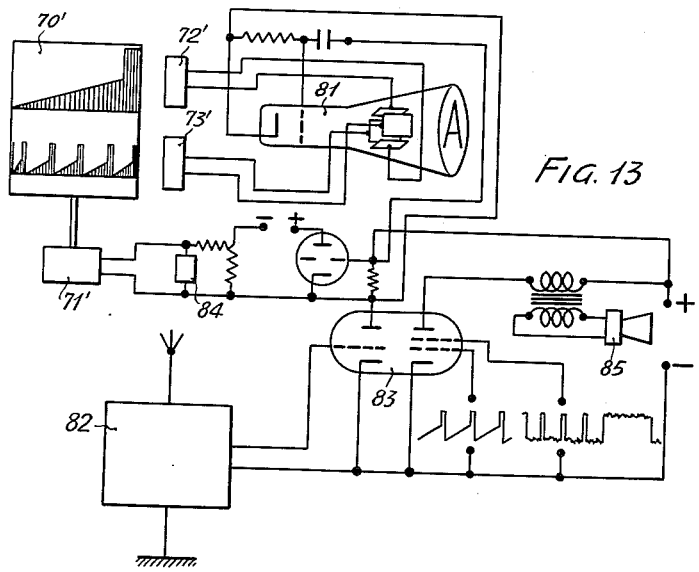

The realization of such a system is diagrammatically illustrated in FIGS. 12 and 13.

Figure 14:
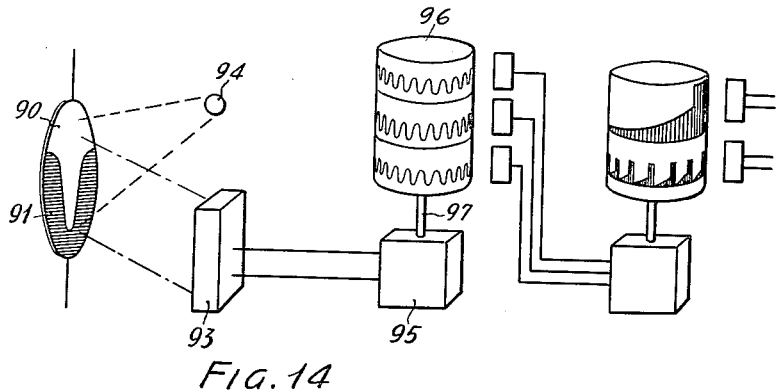
FIG. 14 shows in diagrammatic manner a photoelectric transductor for the generation of an electric voltage of exactly constant frequency in which the moving body carrying the oscillogram consists in a pendulum.

In said figures the two transductors are still clearly visible, the one at the transmitting station consisting in a rotating drum 70 carrying two diagrams respectively presenting the shapes illustrated in FIGS. 14a and 14b, the first of which pertains to the line-axis while the other pertains to the frame-axis. The drum 70 is set into rotation by the motor 71 which in this case will be a synchronous, two-poles, 50 r.p.m. motor, fed with a 50 Hz voltage. The diagrams drawn on the drum 70 will be such as to generate an interlaced, 625 lines and 50 semiframes, reticle in the televisive camera 74. Two photoelectric cells 72 and 73 are combined as in the preceding cases with the drum 70, said cells supplying the electric quantities necessary to form the reticle. In this case a double tube 75 will be utilized for the radio transmission of the three intersecting signals and namely of the video, phonic and feeding signal for the motor of the receiver, said tube comprising a triode valve on which grid 76 is sent the video signal coming from the camera 74, while the other signals will be sent on the three grids of the other valve and namely the phonic signal coming from the microphone 78 on the grid 77, a line-frequency signal derived from the photoelectric cell 73 on the grid 79 and finally a frame-frequency signal derived from the photoelectric cell 72, on the grid 80. The complete compound signal will therefore be obtained on the resistance R2 at the anodic output of the valve 75, said signal presenting the form diagrammatically shown in FIG. 15, where the parts designated $v$ correspond to the video signal, those designated $z$ to the phonic signals and those designated with $w$ to the feeding impulses of the motor.

The receiver shown in FIG. 13 comprises a rotating drum 70' carrying two oscillograms exactly equal to the ones drawn on the drum 70, said drum being driven by a motor 71', equal to the motor 71 and combined with the two photocells 72' and 73' which supply the voltages required to form the reticle on the kinescope 81. The signal reaching by radio said receiver will be demodulated and amplified by the receiving apparatus 82 and a signal corresponding to the one shown in FIG. 15 will be sent to the double tube 83 whose outputs will feed the feeding signal, to the circuit 84 which feeds the motor 71', and the phonic signal will be sent to the loudspeaker 85, while the video signal will modulate the electronic beam of the kinescope 81. The detailed operation of the various elements forming the transmitter and the receiver shown in FIGS. 12 and 13 is not repeated here, as it is obvious from what has been said now and before referring to the preceding figures.

The form of the oscillograms drawn on the rotating drums to generate the reticle will, of course, vary, depending on the method used in the camera and in the kinescope to deflect the oscillographic beam.

Figure 10:
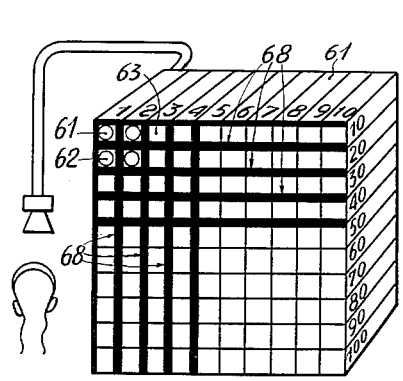
FIG. 10 shows in a diagrammatic manner a compartment unit suitable for the transmission of multiple telephony.
Figure 11:
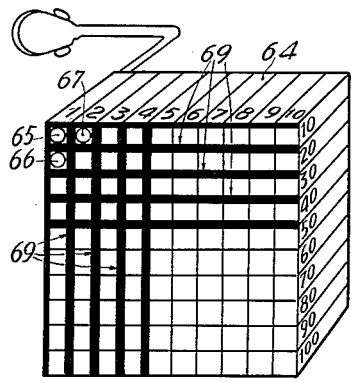
FIG. 11 shows in diagrammatic manner a corresponding compartment-unit suitable for the reception of the system to which pertains FIG. 10.

FIG. 10 shows in diagrammatic manner a compartment unit suitable for a multiple telegraphy or telephony system, compartment unit which should be combined with the one also diagrammatically shown in FIG. 11 and which should be used at the receiving station.

The compartment unit 61 comprises, in the illustrated case, hundred compartments as the ones designated 61, 62 and 63, in each of which is placed, for instance, a luminescent lamp each of which is modulated by a different microphone. For a multiple telephony transmission the compartment-unit 61 is placed in front of an iconoscope of a camera as the one illustrated in the preceding drawings and by the same wire or radio system the image of said compartment unit provided with luminescent lamps of constantly varying luminosity will appear on the screen of a kinescope situated at the receiving station. A compartment unit 64 also provided with hundred compartments will be placed, in front of said screen each of said compartments as the ones designated by 65 66, 67 in FIG. 11, containing a photoelectric cell which will transform the luminous variations appearing corresponding to every compartment into electric variations. By connecting said photoelectric cells with as many telephonic receivers or loud-speakers as said cells, the simultaneous, multiple reception of hundred phonograms will be obtained, but nothing would prevent from even considerably increasing said number, in which case it is only necessay to increase the number of the compartments of the relative compartment-units.

Of course, the various compartments will be separated by the dark strips or bands as the ones designated 68 and 69 in the FIGS. 10 and 11. Said dark horizontal and vertical strips, crossing each other normally, permit to avoid every interference between a user and the other.

Whenever the number of the simultaneous conversations is reduced to ten or only a little more, the reticle may be reduced to the limiting case of a single line or strip and it is clear that the scanning frequency must be of at least 10,000 Hz.

If an alternating, constant frequency current is not available, a rigorously, constant frequency current may be generated by means of a device (FIG. 14) comprising a pendulum 90 on which is traced at least one wave 91 of an oscillogram for instance a sinusoidal, and conveniently corrected one, said oscillogram being placed in front of a photoelectric transductor 93 and conveniently scanned by a suitable radiation beam generated by a source 94. One or two impulses per second will be obtained, said impulses being able to rotate a synchronous, rotating field motor, without iron, which in turn drives a drum or disc 96 carrying one or more oscillograms presenting the desired number of oscillations. By the same system it would be possible to feed synchronous, polyphase motors, in which case it suffices to place two or three, conveniently dephased oscillograms on the drum 96.

If very high frequency should be required, more units as that shown in 93, 95, 96 may be used so as to form a cascade system.

Naturally, the greater is the number of oscillations pertaining to every oscillogram and consequently the smaller is the axial amplitude of every oscillation the thinner must be the beam of luminous (or other type) radiations modulated by the oscillogram itself.

The above considered compartment-system may be also utilized, of course, for the teletransmission of a robot; in this case the compartment units are provided with as many compartments as there are motors on the robot. At the receiving station the programs sent to the motors of the robots may be modified by the particular conditions, combined with the robot.

By the system according to the present invention, it is also possible to transmit a video, and a multiple phonic program by utilizing a portion of the reticle for the video-signal and a portion for the phonic signals. In this case, the compartment units similar to the ones of FIGS. 10 and 11 provided with as many compartments as the number of programs to accompany the video and of the same height as the reticle are placed in front of a lateral portion of the camera's photoelectric plate of the transmitter and a portion of the kinescope's luminescent screen of the receiver.

Naturally, in the preceding specification only some applications of the present invention have been shown and namely those, which in this moment seen more important: the present invention, however, would make possible other embodiments which could be intuitively arranged by the those who are skilled in this art.

Of course the various elements of which consists the present invention and which have been previously considered, may vary according to requirements and be combined with well known and preferred devices. However, all these embodiments and modified applications will be comprised in the scope of the present invention.

The main advantages of the present system have been made clear in the preceding specification; here however they are emphasized again and namely:

A considerable saving in installment, and running expenses compared with the commercially used normal or colour television system or multiple telephony and telegraphy or the like; a great decrease in weight and volume of the sets, as it is possible to use very small kinescope with light-amplifiers and hence to build transportable video-phonic transmitting devices utilising semi-conducting elements. Furthermore the operation of said plants and installments requires only very little adjustment due to the automatic adjustment devices provided in the system according to the invention.

I claim:

1. An electronic system for the transmission of video signals comprising a receiver and a transmitter for generating video signals which are receivable by said receiver; at each of said transmitter and said receiver a double transducing device comprising a rotatable member and a driving means therefor; said member having a line frequency oscillogram and a frame frequency oscillogram formed thereon; a first means at each of said transmitter and said receiver responsive to both of said oscillograms for generating a reticle; said driving means at the transmitter comprising a first motor and at the receiver a second motor; a first device to generate voltages at rigorously constant frequency arranged to feed the first motor controlling the rotation of the rotating member of the transducing device placed at the transmitter; said first device comprising a pendulum having a first oscillogram thereon, a source of radiations including a beam modulated by said first oscillogram, a transducing element for transforming said beam into an electric voltage, a drum, an electric rotating field motor for rotating said drum, said drum carrying at least one oscillogram, another source of radiations having a beam modulated by the last recited oscillogram, a transducer for receiving said last recited radiations and transforming them into electric voltages connected to feed the second motor of the transmitters transducing device.

2. An electronic system for the transmission of video signals comprising a receiver and a transmitter for generating video signals which are receivable by said receiver; at each of said transmitter and said receiver a double transducing device adapted to transform modulated radiations into first and second electric voltages; each of said double transducing devices comprising a rotatable member and a driving means therefor; said member having a line frequency oscillogram and a frame frequency oscillogram formed thereon scanned by beams from a radiation source; a first means at each of said transmitter and said receiver responsive to both of said oscillograms for generating a reticle; each of said driving means comprising a synchronous motor; said motor at the transmitter being fed by a voltage source having a frequency which is a multiple of the frame frequency of the system; said motor at the receiver being fed by frame frequency impulses generated at the transmitter by an extension of the frame frequency oscillogram; said frame frequency impulses being transmitted by said transmitter together with said video signals.

3. An electronic system for transmission of video signals comprising a receiver and a transmitter for generating video signals which are receivable by said receiver; at each of said transmitter and said receiver a double transducing device comprising a rotatable member and a driving means therefor; said member having a line frequency oscillogram and a frame frequency oscillogram formed thereon; a first means at each of said transmitter and said receiver responsive to both of said oscillograms for generating a reticle; radio-active sources at each of said transmitter and said receiver, generating means modulated by their associated oscillograms; each of said first means including a radio-active beam sensing element for each of said oscillograms operatively positioned to receive said modulated beams; each of said driving means being comprised of the same type of synchronous motor controlled by an individual feeding circuit; said receiver comprising a kinescope having a screen including a normally luminous frame portion and a normally dark portion; an automatic phase resetting device for said frame portion; said resetting device comprising a fixed resistance series connected in the feeding circuit of the motor at said receiver, and a photoelectric resistance shunting the terminals of the motor at said receiver; said photoelectric resistance being positioned adjacent to said screen so as to decrease the voltage appearing at said terminals each time the frame is dephased and a luminous strip appears in said normally dark portion.

4. The electronic system as set forth in claim 2 in which the receiver also includes an amplifier having a variable resistance circuit; said amplifier being constructed to supply the impulses derived from the transmitter frame frequency oscillogram to the motor at the receiver.

5. An electronic system for the transmission of video signals comprising a receiver and a transmitter for generating video signals which are receivable by said receiver; at each of said transmitter and said receiver a double transducing device comprising a rotatable member and a driving means therefor; said member having a line frequency oscillogram and a frame frequency oscillogram formed thereon; a first means at each of said transmitter and said receiver responsive to both of said oscillograms for generating a reticle; luminous sources, at each of said transmitter and said receiver, generating beams modulated by their associated oscillograms; each of said first means including a photoelectric element for each of said oscillograms operatively positioned to receive said modulated beams; each of said driving means being comprised of the same type of synchronous motor controlled by an individual feeding circuit; said receiver comprising a kinescope having a screen including a normally luminous frame portion and a normally dark portion; an automatic phase resetting device for said frame portion; said resetting device comprising a fixed resistance series connected in the feeding circuit of the motor at said receiver and a photoelectric resistance shunting the terminals of the motor at said receiver; said photoelectric resistance being positioned adjacent to said screen so as to decrease the voltage appearing at said terminals each time the frame is dephased and a luminous strip appears in said normally dark portion.

6. An electronic system for the transmission of video signals comprising a receiver and a transmitter for generating video signals which are receivable by said receiver; at each of said transmitter and said receiver a double transducing device comprising a rotatable member and a driving means therefor; said member having a line frequency pattern and a frame frequency pattern formed thereon; a first means at each of said transmitter and said receiver responsive to both of said patterns for generating a reticle; said system also transmitting multiple audio signals; said transmitter including a camera having a photoelectric plate and said receiver including a kinescope having a screen; said reticle at both said transmitter and said receiver having the main portion thereof utilized for said video signals and a side portion thereof utilized for said audio signals; a first compartment unit placed in front of a side portion of said photoelectric plate; a second compartment unit placed in front of a side portion of said screen; each of said compartment units being comprised of a plurality of compartments whose heights are equal to the height of the reticle.

7. The electronic system of claim 6 also including an individual luminescent source for each compartment of said transmitter compartment unit; means for modulating said luminescent sources; individual photoelectric means for each compartment of said receiver compartment unit; said compartments being separated by large, dark strips whereby signal interference between adjacent compartments is prevented.

8. A circular radio-television system which comprises a transmitter and a plurality of receivers, the transmitter comprising in combination: a television camera, a microphone, a transducing device provided with frame and line frequency oscillograms, means including a first double valve electronic tube for producing a compound signal, one of said valves being fed with a video signal derived from said camera while the other is fed through individual grids with an audio signal derived from said microphone and signals derived from the frame and line frequency oscillograms having duly corrected shapes; said tube producing a compound signal; and each of said receivers comprising in combination a second transducing device also provided with frame and line frequency oscillograms, a kinescope receiving circuit adapted to convey the video signal to said kinescope, a second double valve electronic tube fed with the compound signal transmitted by the transmitter and in which said signal is decomposed so that the anodic circuit of one of the two valves of said second tube feeds a motor driving the second transducing device with feeding impulses derived from said frame frequency oscillograms while the other anodic circuit of said second tube feeds audio members of the receiver, said last recited valve being cut off by a signal derived from said line frequency oscillogram during that fraction of a frame in which the transmission of the video signal takes place so as to avoid interference between the video signal and the impulses.

9. The system according to claim 4 in which the frame frequency oscillogram of every transducing device comprises a saw-tooth wave having an upwardly projecting extension at the end thereof of substantially rectangular shape and of a duration corresponding to a small fraction of the wave itself and such as to generate a feeding impulse for the synchronous motor driving the transducing device at the receiver.

References Cited in the file of this patent

UNITED STATES PATENTS

| | | |
|---|---|---|
| Re. 22,025 | Wald | Feb. 10, 1942 |
| 2,043,800 | Karolus | June 9, 1936 |
| 2,111,153 | Nichols | Mar. 15, 1938 |
| 2,223,812 | Bedford | Dec. 3, 1940 |
| 2,261,848 | Goldmark | Nov. 4, 1941 |
| 2,450,649 | Finch | Oct. 5, 1948 |
| 2,653,184 | Robinson | Sept. 22, 1953 |
| 2,770,803 | Ellett | Nov. 13, 1956 |

FOREIGN PATENTS

| | | |
|---|---|---|
| 986,834 | France | Apr. 4, 1951 |